(12) United States Patent
Zhang

(10) Patent No.: US 12,510,817 B2
(45) Date of Patent: Dec. 30, 2025

(54) DOUBLE IMAGE PROJECTION LAMP WITH FADE-IN AND FADE-OUT VISUAL EFFECTS

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 311 days.

(21) Appl. No.: 18/487,483

(22) Filed: Oct. 16, 2023

(65) Prior Publication Data

US 2025/0123548 A1    Apr. 17, 2025

(51) Int. Cl.
*G03B 21/14* (2006.01)
*G03B 21/20* (2006.01)
*G03B 23/18* (2006.01)

(52) U.S. Cl.
CPC .......... *G03B 23/18* (2013.01); *G03B 21/145* (2013.01); *G03B 21/2046* (2013.01)

(58) Field of Classification Search
CPC ...... G03B 23/18; G03B 21/145; G03B 21/14; G03B 21/2046; G03B 21/001; G03B 21/02; G03B 21/142; H04N 9/3141
See application file for complete search history.

(56) References Cited

U.S. PATENT DOCUMENTS 10,042,237 B1 *   8/2018   Zhang .................... G03B 21/20

* cited by examiner

*Primary Examiner* — Ryan D Howard
(74) *Attorney, Agent, or Firm* — BACON & THOMAS, PLLC

(57) ABSTRACT

A double image projection lamp has a housing, a first and a second projecting assembly in the housing, a driver, a light shielding element, and a driven component. The second projecting assembly has a shell body pivotally connected to the housing, connected to the driver, and having a sliding groove between a projecting end of the shell body and a light emitting unit of the second projecting assembly. The light shielding element is disposed in the sliding groove. When the driver drives the shell body to pivot, the driven component is driven by the shell body and drives the light shielding element to move along the sliding groove so as to allow light emitted from the light emitting unit to be shielded by the shielding element or travel to the projecting end, which provides fade-in and fade-out visual effects when two projected images move relatively.

8 Claims, 11 Drawing Sheets

DOUBLE IMAGE PROJECTION LAMP WITH FADE-IN AND FADE-OUT VISUAL EFFECTS

BACKGROUND OF THE INVENTION

1. Field of the Invention

The present invention relates to a projection lamp, and particularly to a double image projection lamp with fade-in and fade-out visual effects.

2. Description of Related Art

A projection lamp is used in different situations, e.g., an amusement facility such as a haunted house where the projection lamp projects a horror image such as a ghost. By projecting the image, the projection lamp enhances the atmosphere of the environment and improve experience of people in the facilities.

However, the image projected by a conventional projection lamp is monotonous. Although some conventional projection lamps allow the projected image to move vertically or laterally or rotate, the projected image itself has no variability. Thereby, improvement of people's experience is limited, and the conventional projection lamp still can be improved.

To overcome the shortcomings of the conventional projection lamp, the present invention provides a double image projection lamp with fade-in and fade-out visual effects to mitigate or obviate the aforementioned problems.

SUMMARY OF THE INVENTION

The main objective of the present invention is to provide a double image projection lamp with fade-in and fade-out visual effects which projects images with variability to improve experience of people in facilities or special venues.

The double image projection lamp with fade-in and fade-out visual effects has a housing, a first projecting assembly, a second projecting assembly, a driver, a light shielding element, and a driven component. The first projecting assembly is disposed in the housing. The second projecting assembly is disposed in the housing and has a shell body, a light emitting unit, and an image film. The shell body is pivotally connected to the housing and has a projecting end and a sliding groove. The light emitting unit is disposed inside the shell body and defines the sliding groove between the light emitting unit and the projecting end. The image film is disposed inside the shell body and between the light emitting unit and the projecting end of the shell body. The driver is connected to the shell body and is configured to drive the shell body to pivot relative to the housing. The light shielding element is disposed in the sliding groove, and the driven component is disposed to the housing, is connected to the shell body, and is linked with the light shielding element. When the shell body pivots, the driven component is driven by the shell body and drives the light shielding element to move along the sliding groove so as to allow light emitted from the light emitting unit to be shielded by the light shielding element or travel to the projecting end.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
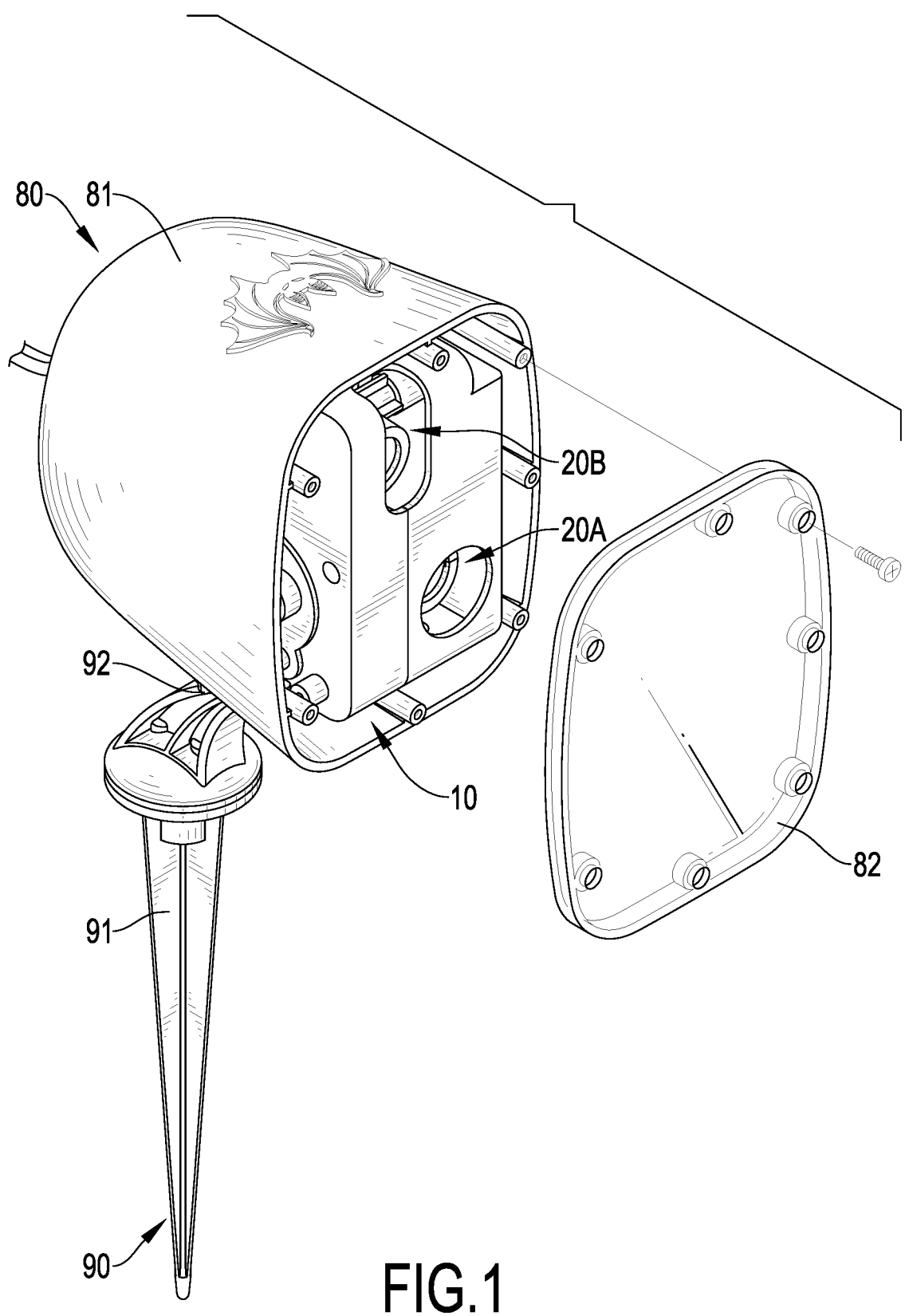
FIG. 1 is an exploded view of an outer shell of a double image projection lamp with fade-in and fade-out visual effects of a preferred embodiment in accordance with the present invention.
Figure 2:
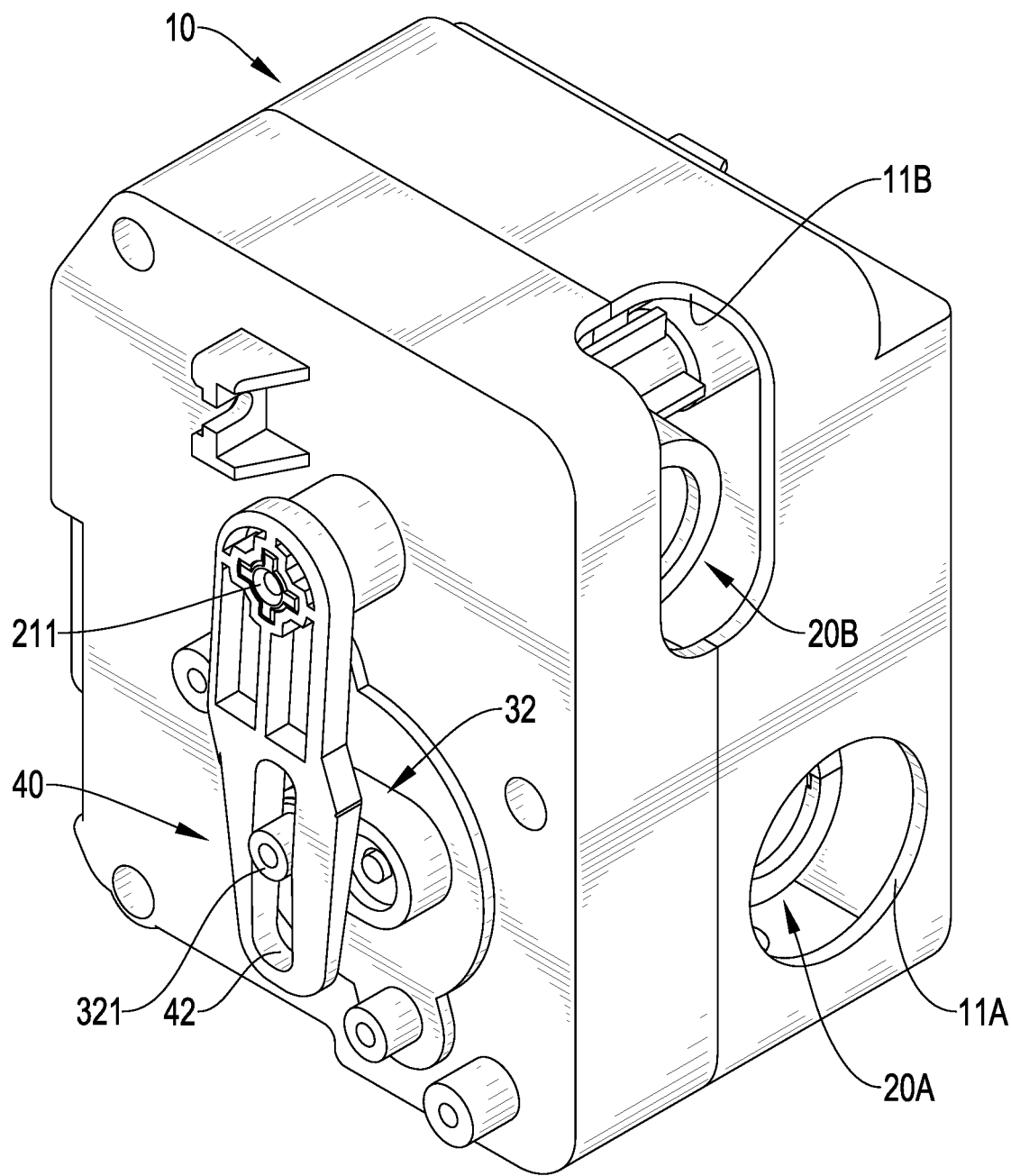
FIG. 2 is a perspective view of the double image projection lamp in FIG. 1 omitting an outer shell and a mounting component.
Figure 3:
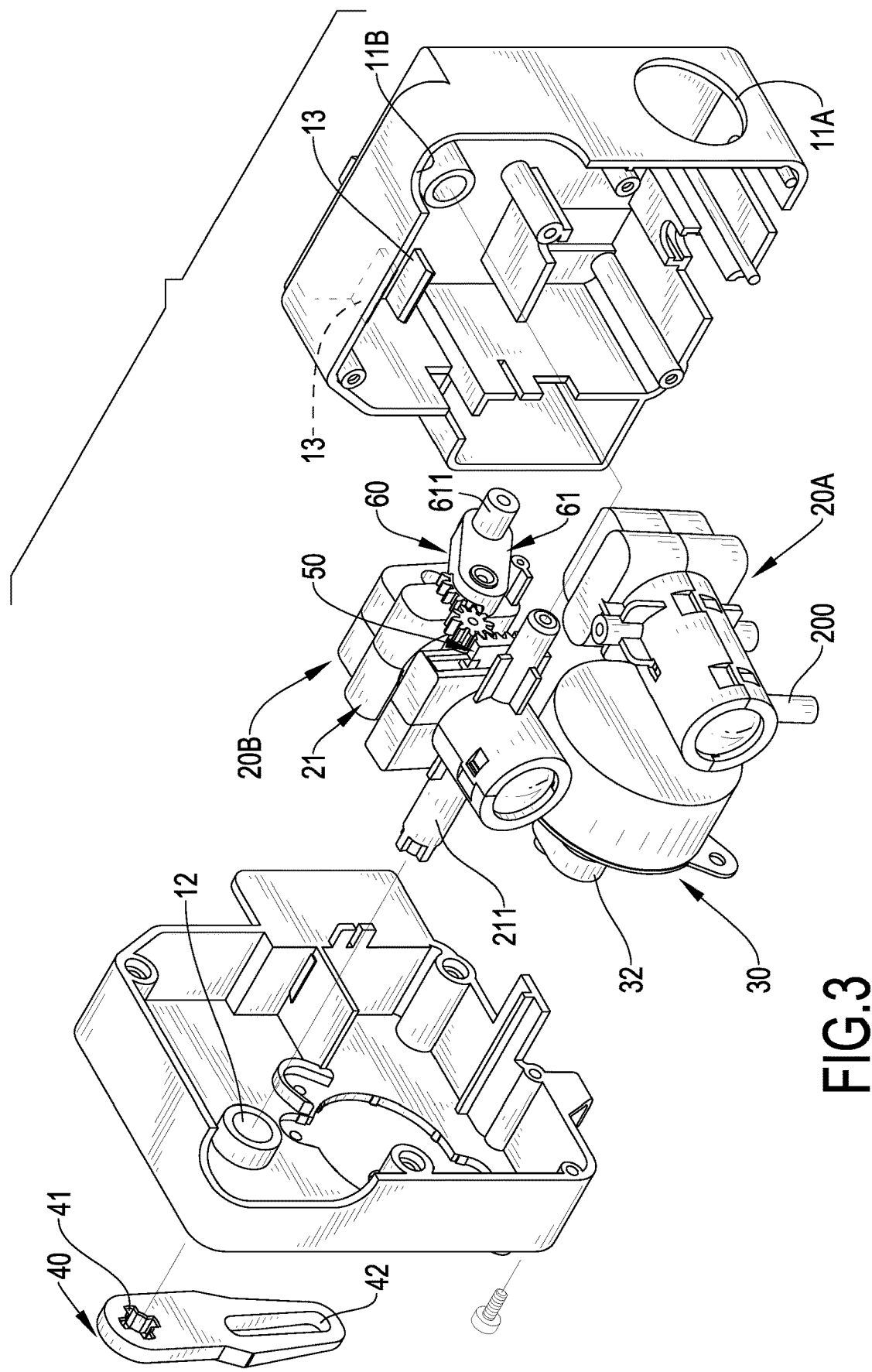
FIG. 3 is an exploded view of a housing of the double image projection lamp in FIG. 1.

With reference to FIGS. 1 to 3, a double image projection lamp with fade-in and fade-out visual effects of a preferred embodiment in accordance with the present invention has a housing 10, a first projecting assembly 20A, a second projecting assembly 20B, a driver 30, a transmission element 40, a light shielding element 50, and a driven component 60. The first projecting assembly 20A and the second projecting assembly 20B are disposed inside the housing 10. The driver 30 is configured to drive the second projecting assembly 20B via the transmission element 40. The light shielding element 50 is disposed to the second projecting assembly 20B; the driven component 60 is disposed to the housing 10 and is configured to drive the light shielding element 50 to move so as to determine if the second projecting assembly 20B projects an image.

With reference to FIG. 1, in the preferred embodiment, the double image projection lamp has an outer shell 80 and a mounting component 90. The housing 10 is disposed inside the outer shell 80, and the outer shell 80 is disposed on the mounting component 90 such that the double image projection lamp can be mounted via the mounting component 90. Specifically, the outer shell 80 has a main body 81 and a cover 82, and the cover 82 is connected to the main body 81, covers an opening of the main body 81 near the right side of FIG. 1, and is made of a transparent material; thereby, lights for projecting from the first projecting assembly 20A and the second projecting assembly 20B can travel through the cover 82 and eventually achieve the effect of projection.

With reference to FIG. 1, the mounting component 90 has an insertion element 91 and a top mount 92. The insertion element 91 is configured to be inserted into a soft surface such as the soil, and the top mount 92 is disposed on a top of the insertion element 91 to allow the outer shell 80 to be mounted thereon. Specifically, the top mount 92 may adopt a universal mount, which allows a direction of the outer shell 80 to be adjusted and allows said projecting assemblies to project toward different directions.

With reference to FIGS. 2 and 3, the housing 10 has a first projecting hole 11A and a second projecting hole 11B respectively for the lights from the first projecting assembly 20A and the second projecting assembly 20B when projecting, wherein the second projecting hole 11B extends from a side of the housing 10 to a top of the housing 10 and is an elongated hole. In the preferred embodiment, the first projecting assembly 20A is fixed to the housing 10; specifically, the first projecting assembly 20A has multiple positioning cylinders 200, and each one of the multiple positioning cylinders 200 is inserted into a corresponding hole on the housing 10 to allow the first projecting assembly 20A to be fixed to the housing 10 and allow an image projected by the first projecting assembly 20A to stay at a same position. Configurations for projecting of the first projecting assembly 20A are basically same as configurations of the second projecting assembly 20B described below and are thus not redundantly described here.

Figure 4:
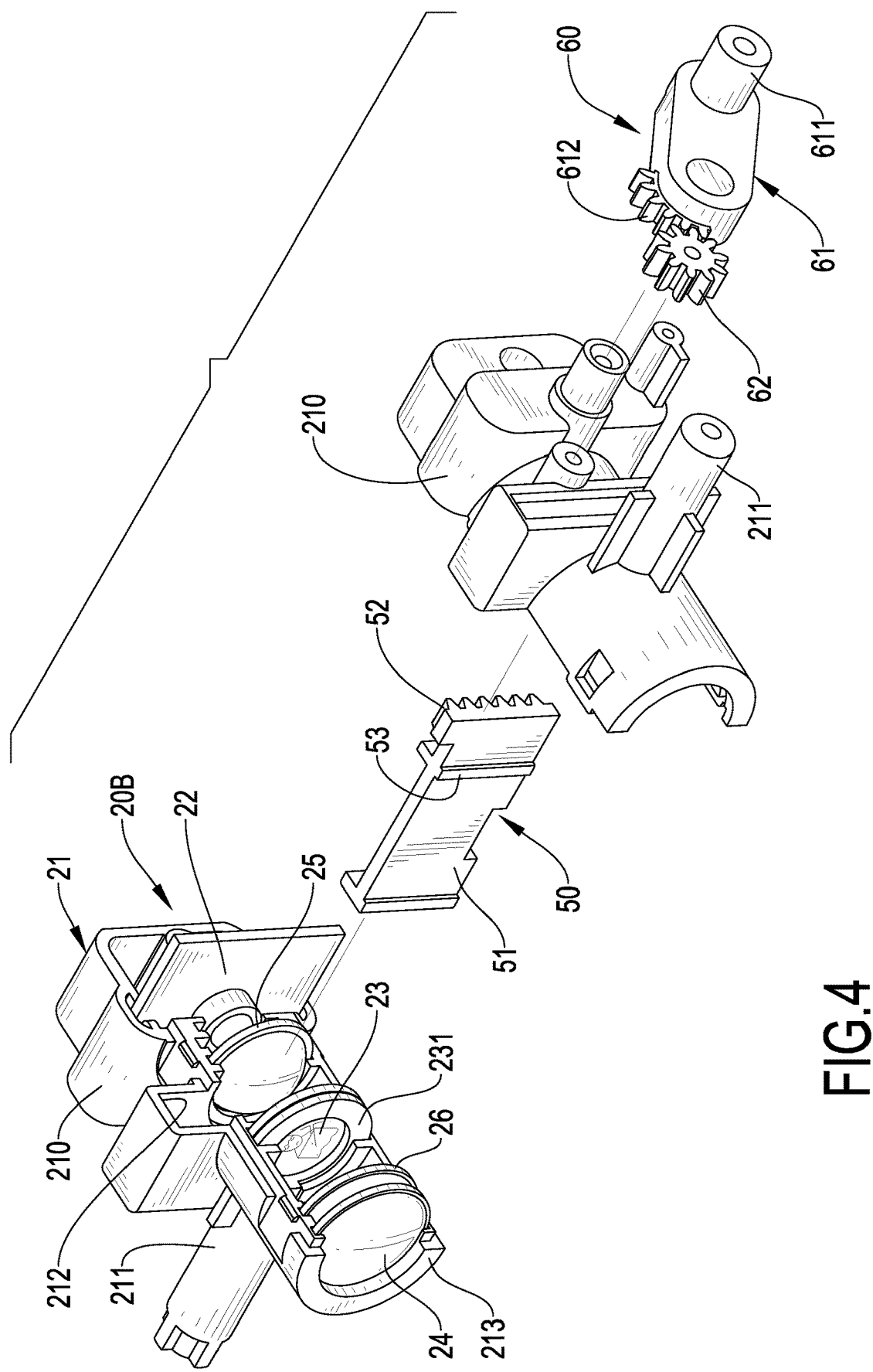
FIG. 4 is an exploded view of a second projecting assembly of the double image projection lamp in FIG. 1.

With reference to FIGS. 3 and 4, the second projecting assembly 20B has a shell body 21, a light emitting unit 22, an image film 23, and a lens component, wherein the light emitting unit 22, the image film 23, and the lens component are disposed inside the shell body 21. The shell body 21 is pivotally connected to the housing 10 and has a projecting end 213; specifically, the housing 10 has two pivot holes 12 aligned with each other, and the shell body 21 has two pivot portions 211 respectively extending toward two opposite directions and respectively inserted into the two pivot holes 12 such that the shell body 21 is configured to pivot relative to the housing 10 and allow an image projected by the second projecting assembly 20B to move as the shell body 21 pivots.

Figure 7:
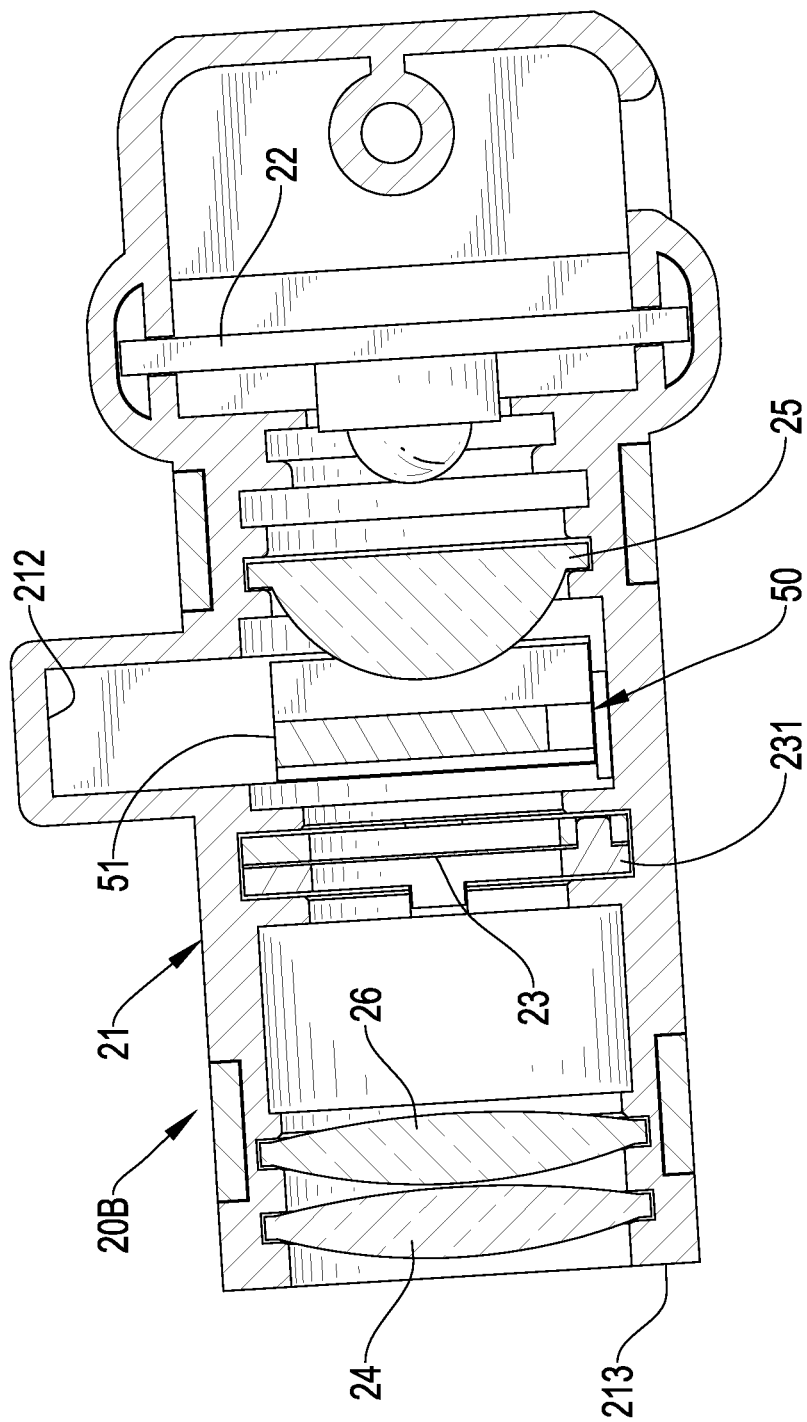
FIG. 7 is a sectional side view of the second projecting assembly of the double image projection lamp in FIG. 1 in the first projecting condition.

With reference to FIGS. 4 and 7, the lens component has multiple lenses disposed between the light emitting unit 22 and the projecting end 213 to adjust the direction of the light from the light emitting unit 22 and ensure the light to travel through the image film 23, leave from the projecting end 213, and project the image at a target position. In the preferred embodiment, the lens component has a projecting lens 24 disposed adjacently to the projecting end 213, a former lens 25 disposed between the light emitting unit 22 and the image film 23, and a middle lens 26 disposed between the image film 23 and the projecting lens 24 and disposed adjacently to the projecting lens 24, wherein the projecting lens 24, the former lens 25, and the middle lens 26 are all convex lens.

Figure 6:
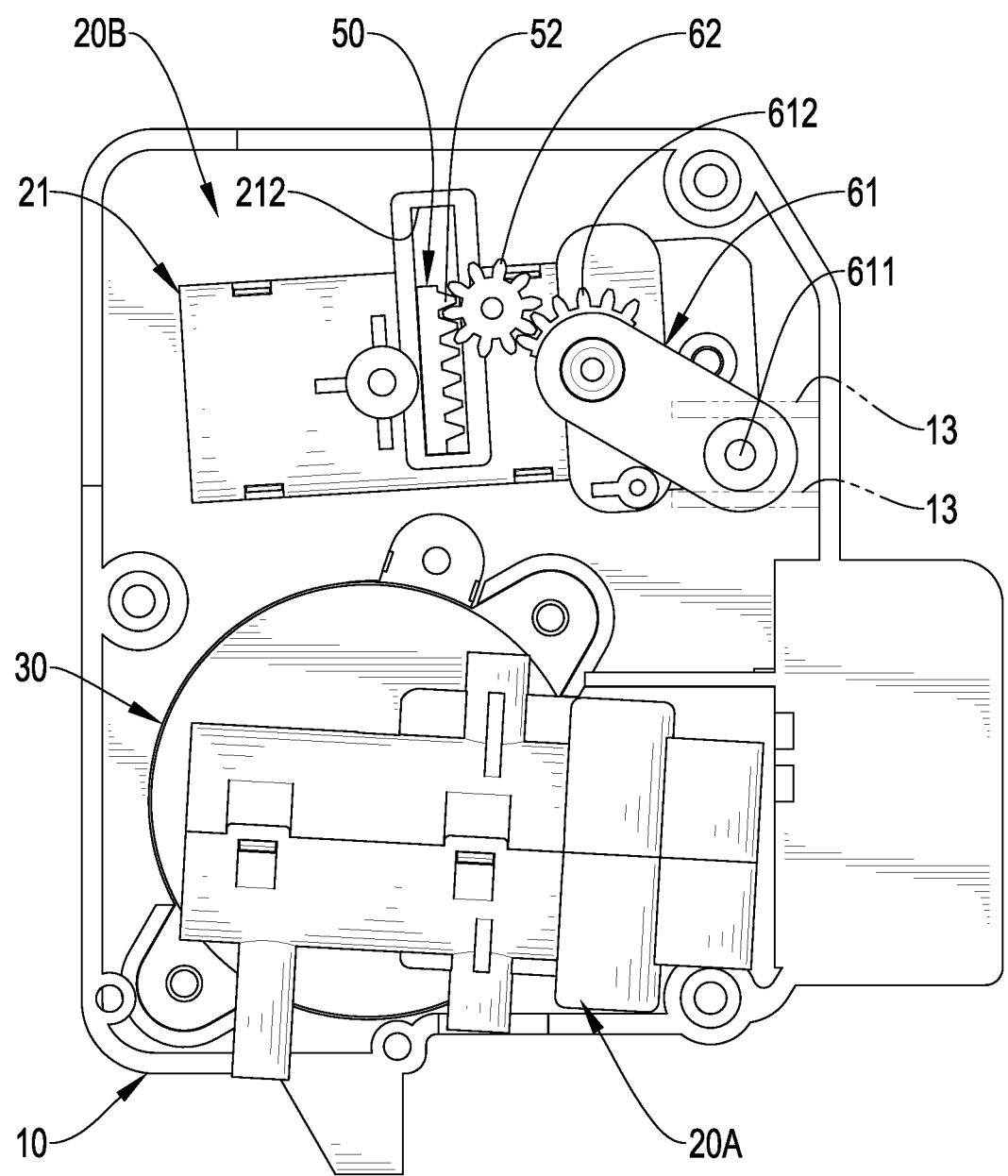
FIG. 6 is another side view of the double image projection lamp in FIG. 1 in the first projecting condition omitting parts of the housing.

With reference to FIGS. 4 and 6, the shell body 21 has a sliding groove 212 located between the light emitting unit 22 and the projecting end 213 for the light shielding element 50 to be disposed therein. Moreover, with reference to FIG. 4, in the preferred embodiment, the shell body 21 is mainly composed of two half shell bodies 210 connected to each other, and the shell body 21 has multiple annular ditches arranged at spaced intervals inside the shell body 21, which allows the light emitting unit 22, the image film 23, and the lens component to be mounted and positioned. The image film 23 is fixed by a film holder.

Figure 5:
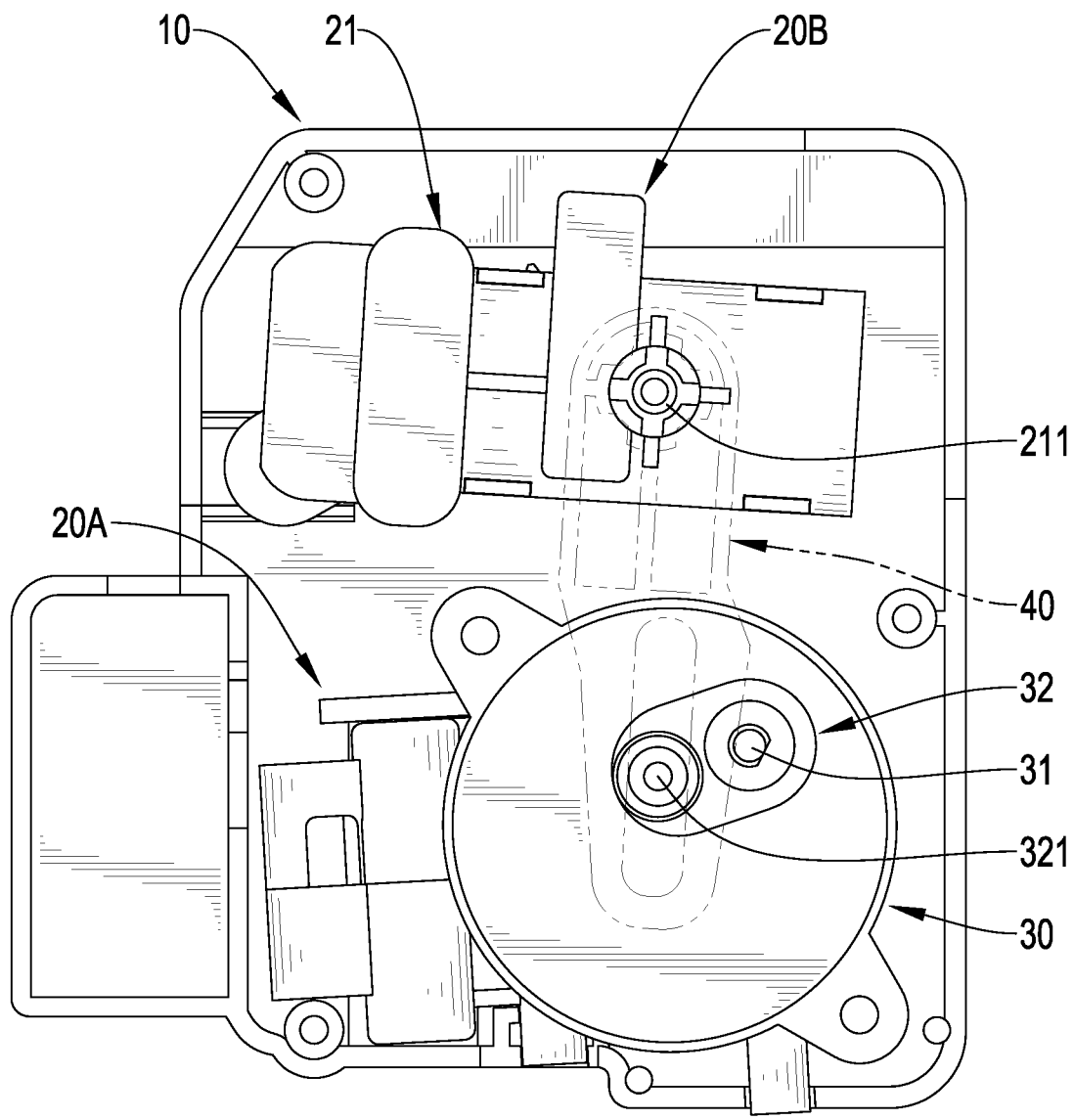
FIG. 5 is a side view of the double image projection lamp in FIG. 1 in a first projecting condition omitting parts of the housing.

With reference to FIGS. 2, 3, and 5, in the preferred embodiment, the driver 30 adopts an eccentric motor, and specifically, the eccentric motor has an electric motor body having an output shaft 31 and an eccentric rotor 32 pivotally connected to the output shaft 31 and having an eccentric shaft 321 being parallel to the output shaft 31. The transmission element 40 connects the eccentric shaft 321 and the shell body 21 such that the driver 30 is configured to drive the shell body 21 to pivot back and forth relative to the housing 10 via transmission of the transmission element 40.

With reference to FIGS. 2, 3, and 5, specifically, the transmission element 40 has a fixed hole 41 and an elongated hole 42. One of the two pivot portions 211 of the shell body 21 is connected to the fixed hole 41, wherein a shape of a space in the fixed hole 41 matches a shape of a part of said pivot portion 211 connected to the fixed hole 41 such that the transmission element 40 is fixed to the shell body 21. The eccentric shaft 321 is inserted into and is engaged with the elongated hole 42. Thereby, when the electric motor operates, the output shaft 31 rotates and drives the eccentric rotor 32 to rotate, and the eccentric rotor 32 drives the transmission element 40 to swing back and forth by the eccentric shaft 321 such that the transmission element 40 drives the shell body 21 fixed to the transmission element 40 to pivot relative to the housing 10.

Figure 9:
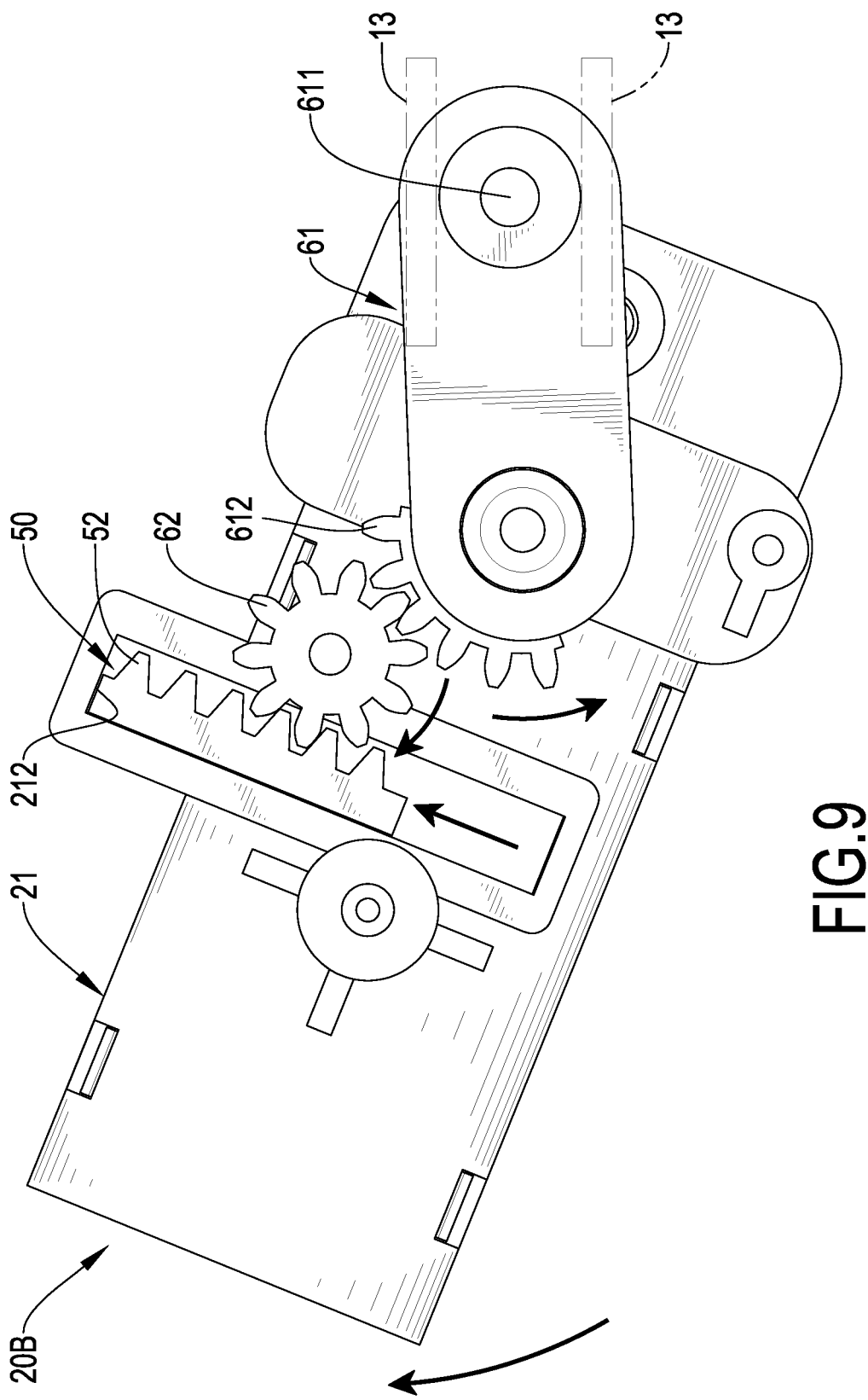
FIG. 9 is another side view of the double image projection lamp in FIG. 1 in the second projecting condition omitting parts of the housing.

With reference to FIGS. 4 and 6, the light shielding element 50 is disposed in the sliding groove 212 of the shell body 21. The driven component 60 has a driven arm 61 having two opposite ends respectively being a first end and a second end; the first end of the driven arm 61 is pivotally connected to the shell body 21 and is linked with the light shielding element 50, and the second end of the driven arm 61 is linear-movably disposed to the housing 10. With reference to FIGS. 6 and 9, thereby, the driven arm 61 is configured to swing when the shell body 21 pivots and drive the light shielding element 50 to move along the sliding groove 212.

With reference to FIGS. 3, 4 and 6, specifically, the driven arm 61 has a cylinder 611 located on the second end of the driven arm 61, and the housing 10 has two limiting boards 13 protruding from an inside wall of the housing 10 and being parallel. The cylinder 611 is inserted between the two limiting boards 13 and is configured to move linearly along and between the two limiting boards 13. With reference to FIGS. 4 and 6, in the preferred embodiment, the driven component 60 has a driven gear 62, and the first end of the driven arm 61 is linked with the light shielding element 50 via the driven gear 62. Specifically, the driven gear 62 is rotatably disposed on the shell body 21, and the driven arm 61 has an engaging portion 612 located on the first end of the driven arm 61 and engaged with the driven gear 62. The light shielding element 50 has a light shielding portion 51 and a rack portion 52 connected to each other; the light shielding portion 51 is located inside the sliding groove 212, and the rack portion 52 is located outside the sliding groove 212 and is engaged with the driven gear 62. With the above configuration, the driven arm 61 is configured to drive the light shielding element 50 to move along the sliding groove 212 via transmission of the driven gear 62.

Figure 11:
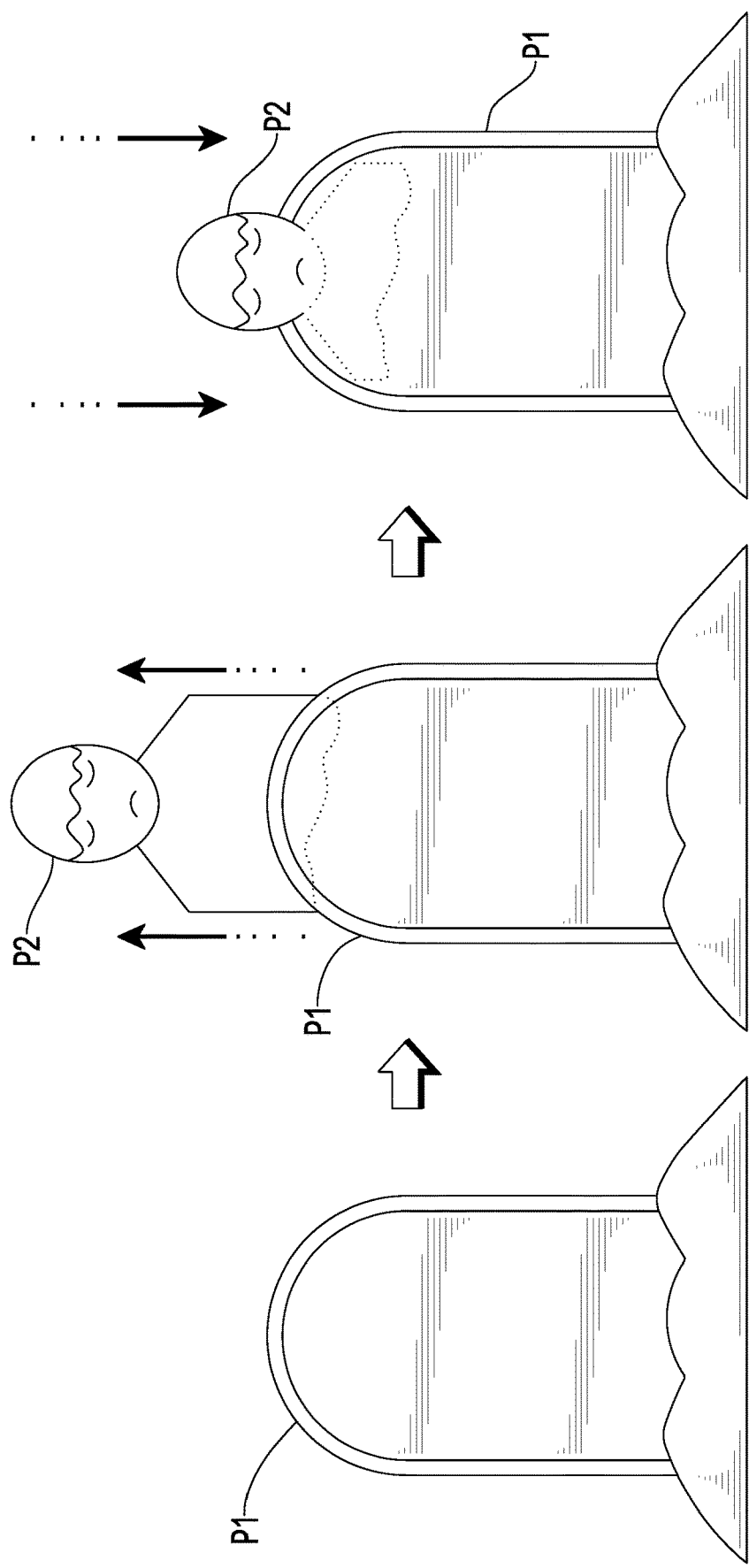
FIG. 11 depicts variation of images projected by the double image projection lamp in FIG. 1.

Operation of the double image projection lamp with fade-in and fade-out visual effects is described below. First, the driver 30 does not start, and the double image projection lamp is in a first projecting condition. With reference to FIGS. 5 to 7, at the time, the projecting end 213 of the second projecting assembly 20B (right side of FIG. 5 and left sides of FIGS. 6 and 7) slightly droops, and with reference to FIGS. 6 and 7, the light shielding element 50 is located at a bottom of the sliding groove 212 and shields light emitted from light emitting unit 22 toward the projecting end 213 such that the second projecting assembly 20B cannot project the image. With reference to a left side of FIG. 11, hence, the double image projection lamp only projects a first image P1 by the first projecting assembly 20A.

Figure 8:
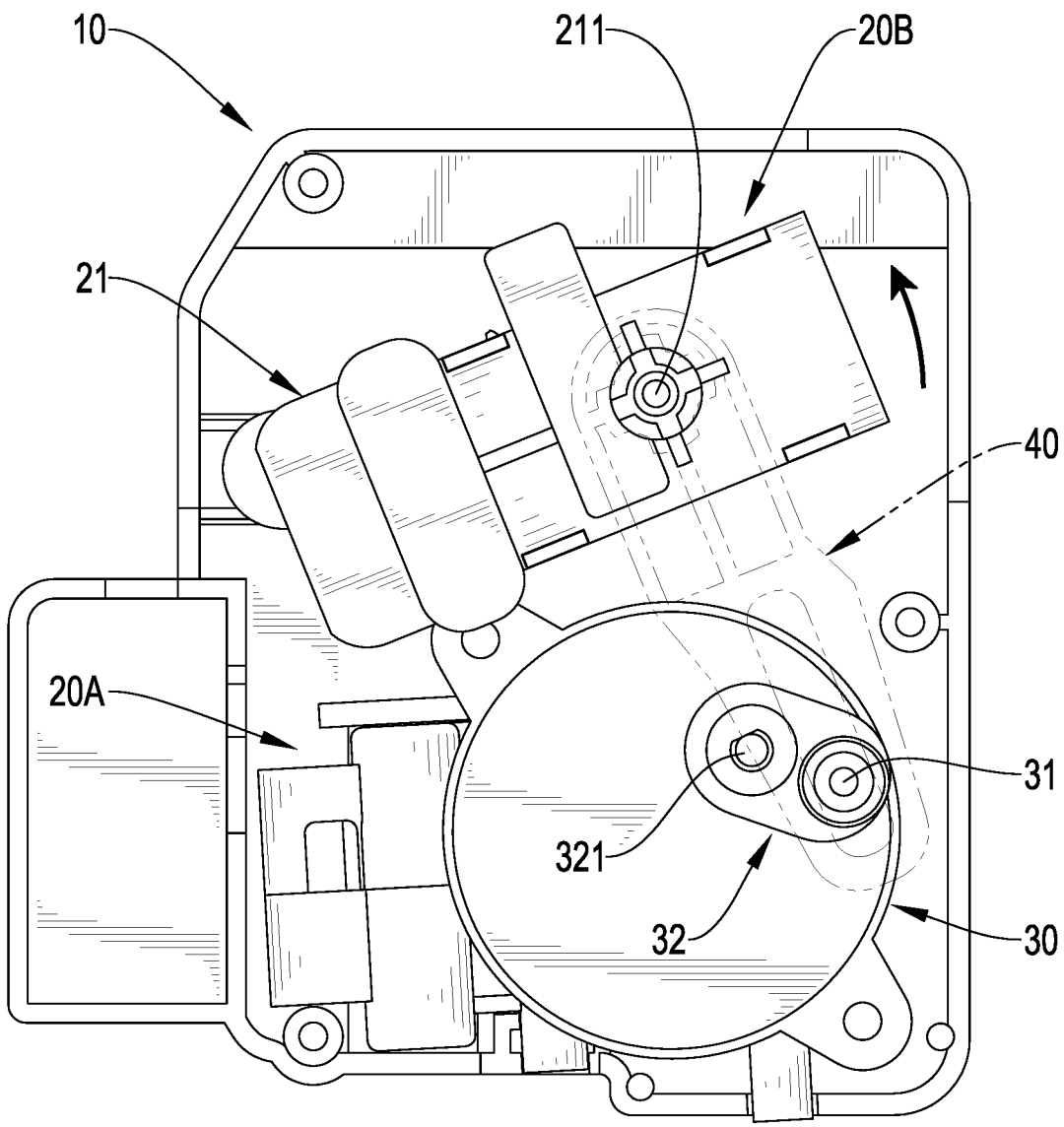
FIG. 8 is a side view of the double image projection lamp in FIG. 1 in a second projecting condition omitting parts of the housing.
Figure 10:
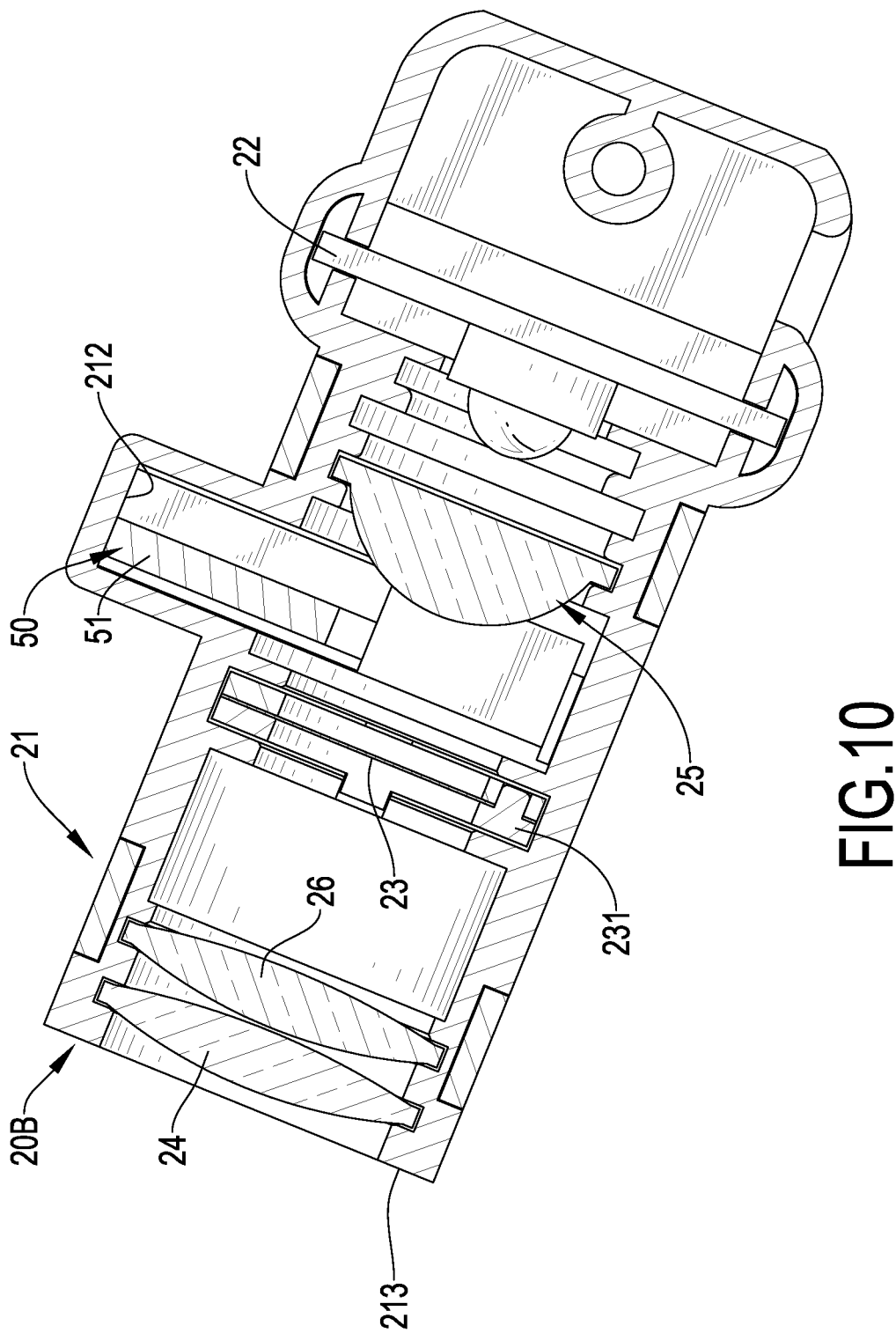
FIG. 10 is a sectional side view of the second projecting assembly of the double image projection lamp in FIG. 1 in the second projecting condition.

Afterwards, the driver 30 starts to operate and drives the shell body 21 to pivot relative to the housing 10; with reference to FIGS. 8 to 10, the projecting end 213 of the second projecting assembly 20B (right side of FIG. 8 and left sides of FIGS. 9 and 10) ascends, and the double image projection lamp turns to a second projecting condition. With reference to FIG. 9, the shell body 21 drives the driven arm 61 to swing relative to the shell body 21 when pivoting such that the engaging portion 612 drives the driven gear 62 to rotate, and the light shielding element 50 is gradually moved to a top of the sliding groove 212 by the driven gear 62. Thereby, light emitted from the light emitting unit 22 of the second projecting assembly 20B is allowed to travel through the image film 23 and to the projecting end 213. With reference to a middle of FIG. 11, thereby, a second image P2 projected by the second projecting assembly 20B gradually fades in while moving upward from the first image P1. In the preferred embodiment, the second image P2 shows a ghost, and the first image P1 shows a tombstone, and the double image projection lamp thus provide a visual effect of the ghost fades in as moving upward from the tombstone.

As the driver 30 keeps operating, the shell body 21 pivots backward, and the projecting end 213 of the second projecting assembly 20B droops again. The light shielding element 50 is gradually moved back to the bottom of the sliding groove 212 by the transmission of the driven arm 61 and the driven gear 62, and the light emitted from the light emitting unit 22 of the second projecting assembly 20B is gradually shielded again. With reference to a right side of FIG. 11, thereby, the second image P2 gradually fades out while moving downward toward the first image P1 and totally fades out when the double image projection lamp is back in the first projecting condition. In the preferred embodiment, the double image projection lamp thus provides a visual effect of the ghost returns to the tombstone and gradually fades out. As the driver 30 operates, the double image projection lamp can cyclically switch between the first projecting condition and the second projecting condition.

In the double image projection lamp of the present invention, the shell body 21 is driven by the driver to pivot, and the light shielding element 50 is driven by the driven component 60 to move along the sliding groove 212 when the shell body 21 pivots such that light emitted from the light-emitting element 22 is shielded by the light shielding element 50 or travels to the projecting end 213 for projecting. Hence, the double image projection lamp can project two images that can move relatively and provide visual effects of fade-in and fade-out at the same time, and a picture projected by the double image projection lamp has more variability, which improves experience of people in a facility adopting the double image projection lamp.

In other embodiments, the driven component 60 may adopt other mechanisms such as pulleys and belts; as long as the driven component 60 is configured to drive the light shielding element 50 to move along the sliding groove 212 when the shell body 21 pivots, and allows light emitted from the light emitting unit 22 to be shielded by the light shielding element 50 or travel to the projecting end 213, the double image projection lamp provides the visual effects of fade-in and fade-out of the present invention. Configurations of the driven component 60 are not limited to the preferred embodiment.

With reference to FIG. 4, in the preferred embodiment, the light shielding element 50 further has a position-limiting portion 53 connected to the light shielding portion 51 and the rack portion 52. The position-limiting portion 53 is engaged inside the sliding groove 212 such that the light shielding element 50 can be prevented from dropping from the sliding groove 212. Specifically, the position-limiting portion 53, the light shielding portion 51 and the rack portion are formed in one piece, and a width of the position-limiting portion 53 is smaller than a width of a groove opening of the sliding groove 212. When mounting, the two half shell bodies 210 are separated first, and the rack portion 52 is inserted through the groove opening of the sliding groove 212 from an inner side of one of the two half shell bodies 210 to an outer side of the above-mentioned shell body 210. Afterwards, the two half shell bodies 210 are connected, and the position-limiting portion 53 is thus engaged inside the sliding groove 212. In other embodiments, the sliding groove 212 may have other engaging construction such as a protrusion inside the sliding groove 212 to be engaged with the position-limiting portion 53 of the light shielding element 50, which still prevents the light shielding element 50 from dropping.

In the preferred embodiment, the driver 30 adopts the eccentric motor cooperating with the transmission element 40 to drive the shell body 21 to pivot. In other embodiments, the driver 30 may adopt other driving device, or the transmission element 40 may be omitted with the driver directly connected to the shell body 21; the above-mentioned embodiments still allow the driver 30 to drive the shell body 21 to pivot. The driver 30 being the eccentric motor and the transmission element 40 in the preferred embodiment reduce a total space occupied by the driving mechanism, which reduces a volume of the double image projection lamp and allows the double image projection lamp to be portable.

Further, with reference to FIGS. 3 and 6, in the preferred embodiment, the first projecting assembly 20A and the driver 30 are disposed adjacently, and the second projecting assembly 20B is disposed above the first projecting assembly 20A and the driver 30. The first projecting assembly 20A and the driver 30 fixed to the housing 10 are disposed tightly, and the second projecting assembly 20B with the shell body 21 being pivotable is disposed with an interval between the second projecting assembly 20B and the above-mentioned first projecting assembly 20A and the driver 30. Thereby, the shell body 21 can pivot without interfering with the first projecting assembly 20A and the driver 30, and the total space occupied by the components in the housing 10 can be reduced.

Moreover, with reference to FIGS. 2 and 3, in the preferred embodiment, the electric motor of the driver 30 is disposed inside the housing 10, and the output shaft 31 is mounted through the housing 10 and extends to an exterior of the housing 10; the eccentric rotor 32 is connected to a portion of the output shaft 31 outside the housing 10 and is located outside the housing 10. One of the two pivot portions 211 of the shell body 21 is mounted through the corresponding one of the two pivot holes 12 and extends to the exterior of the housing 10. The transmission element 40 is fixed to a part of the pivot portion 211 outside the housing 10 and is operably connected to the eccentric shaft 321 of the eccentric rotor 32. With the output shaft 31 and the corresponding pivot portion 211 mounted through the housing 10, the transmission element 40 requiring more space for swinging can be disposed outside the housing 10 and can be prevented from interfering with or colliding with other components inside the housing 10, which prevents components from being damaged.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A double image projection lamp with fade-in and fade-out visual effects comprising:
    a housing;
    a first projecting assembly disposed in the housing;
    a second projecting assembly disposed in the housing and having
        a shell body pivotally connected to the housing and having a projecting end and a sliding groove;
        a light emitting unit disposed inside the shell body and defining the sliding groove between the light emitting unit and the projecting end; and
        an image film disposed inside the shell body and between the light emitting unit and the projecting end of the shell body;
    a driver connected to the shell body and configured to drive the shell body to pivot relative to the housing;
    a light shielding element movably disposed in the sliding groove; and
    a driven component disposed to the housing, connected to the shell body, and linked with the light shielding element;
    wherein when the shell body pivots, the driven component is driven by the shell body and drives the light shielding element to move along the sliding groove so as to allow light emitted from the light emitting unit to be shielded by the light shielding element or travel to the projecting end.

2. The double image projection lamp with fade-in and fade-out visual effects as claimed in claim 1, wherein
    the driven component has
        a driven arm having
            a first end pivotally connected to the shell body and linked with the light shielding element; and
            a second end opposite to the first end and linear-movably disposed on the housing; and
    the driven arm is configured to swing when the shell body pivots and drive the light shielding element to move.

3. The double image projection lamp with fade-in and fade-out visual effects as claimed in claim 2, wherein
    the housing has two limiting boards protruding from an inside wall of the housing and being parallel; and
    the driven arm has a cylinder located on the second end of the driven arm, inserted between the two limiting boards, and configured to move linearly along the two limiting boards.

4. The double image projection lamp with fade-in and fade-out visual effects as claimed in claim 2, wherein
    the driven component has a driven gear rotatably disposed on the shell body;
    the driven arm has an engaging portion located on the first end of the driven arm and engaged with the driven gear; and
    the light shielding element has
        a light shielding portion located inside the sliding groove; and
        a rack portion connected to the light shielding portion, located outside the sliding groove, and engaged with the driven gear.

5. The double image projection lamp with fade-in and fade-out visual effects as claimed in claim 4, wherein the light shielding element has a position-limiting portion connected to the light shielding portion and the rack portion and engaged inside the sliding groove.

6. The double image projection lamp with fade-in and fade-out visual effects as claimed in claim 1, wherein
    the driver is an eccentric motor having an eccentric shaft;
    the double image projection lamp has a transmission element fixed to the shell body and has an elongated hole; and
    the eccentric shaft is inserted into the elongated hole and configured to drive the transmission element to pivot the shell body relative to the housing.

7. The double image projection lamp with fade-in and fade-out visual effects as claimed in claim 6, wherein
    the eccentric shaft of the driver is located outside the housing;
    the shell body has a pivot portion mounted through the housing and extending to an exterior of the housing to allow the shell body to be pivotally connected to the housing; and
    the transmission element is connected to a part of the pivot portion outside the housing to be disposed outside the housing.

8. The double image projection lamp with fade-in and fade-out visual effects as claimed in claim 1, wherein
    the first projecting assembly and the driver are disposed adjacently; and
    the second projecting assembly is disposed above the first projecting assembly and the driver.

* * * * *